United States Patent
Loesch et al.

(10) Patent No.: US 6,769,094 B2
(45) Date of Patent: Jul. 27, 2004

(54) METHOD FOR GENERATING MULTIMEDIA PROJECTS

(75) Inventors: Jochen Loesch, Munich (DE); Heiko Wuersig, Unterfoehring (DE); Shailia Stephens-Wuersig, Unterfoehring (DE)

(73) Assignee: Sanafir New Media & Online AG, Neuried (DE)

( * ) Notice: Subject to any disclaimer, the term of this patent is extended or adjusted under 35 U.S.C. 154(b) by 685 days.

(21) Appl. No.: 09/790,517

(22) Filed: Feb. 23, 2001

(65) Prior Publication Data

US 2002/0052976 A1 May 2, 2002

(30) Foreign Application Priority Data

Oct. 30, 2000 (DE) .......................... 100 53 856

(51) Int. Cl.[7] .............................................. G06F 17/00
(52) U.S. Cl. ................................................... 715/500.1
(58) Field of Search .................. 715/500.1; 348/14.12; 370/538

(56) References Cited

U.S. PATENT DOCUMENTS 5,659,790 A * 8/1997 Kim et al. ............... 715/500.1
6,094,212 A * 7/2000 Imaeda ..................... 348/14.12
6,100,881 A * 8/2000 Gibbons et al. .......... 715/500.1
6,212,208 B1 * 4/2001 Yoneda et al. .............. 370/538

* cited by examiner

Primary Examiner—Sanjiv Shah
(74) Attorney, Agent, or Firm—Stuart J. Friedman

(57) ABSTRACT

The invention relates to a method for generating a multimedia project comprising at least one page, with the aid of a computer, a storage medium to which the computer has access, an input device, a display and a standard multimedia authoring tool comprising the following steps: providing the multimedia elements desired for the multimedia project on the storage medium, providing one or more templates generated in the format of the standard multimedia authoring tool with predefined dummies on the storage medium, defining the structure of the multimedia project with the aid of the input device, the display and computer by defining the desired number of pages of the multimedia project and assigning to the pages desired templates, saving the structure on the storage medium, assigning to the dummies the desired multimedia elements and functions with the aid of the input device, the display and the computer and saving the assignments on the storage medium, communicating the data saved in the two preceding steps to the standard multimedia authoring tool, and generating the multimedia project with the standard multimedia authoring tool using the data communicated in the previous step.

16 Claims, 2 Drawing Sheets

METHOD FOR GENERATING MULTIMEDIA PROJECTS

TECHNICAL BACKGROUND OF THE INVENTION

A multimedia project in this context is understood to be a spatial presentation in time of a set of data displayable by means of a computer system. The majority of multimedia projects permit the user to interact to a certain extent with the project. Examples of multimedia projects are homepages callable via the Internet or an Intranet or interactive company catalogs, which can be stored on CD-ROMs, for example.

One of the major standard multimedia authoring tools for authoring multimedia projects is the Macromedia Inc. Director® program. Director® provides the user with immense possibilities in authoring and editing multimedia projects. Due to this high versatility the user is forced, however, to reckon with a lengthy training period in getting used to the program.

The way in which Macromedia Director® (simple termed Director® in the following) works will now be briefly described. When authoring a new multimedia project, termed "movie" in Director® language, the user begins with an empty Director® film. He is first required to define his "actors" by entering "contents"—which may be e.g. texts, images, films, sounds etc—into the casting list, the so-called "cast". The "actors" are then positioned in the display on the so-called "stage", while features such as position and size are defined. At the same time the actors are listed in the script, the so-called "score", in which the presence in time is defined, i.e. the point in time of an actor appearing on or leaving the stage. The "score" is a table whose columns correspond to time units and in the lines of which the actors are listed for the duration of their staging in the multimedia project. Motion effects of each actor or functions such as e.g. links, events actuated by mouse movements, etc. can be assigned to the actors at the corresponding position in the score via a Lingo® script. Lingo® is a programming language of Director®.

A "page" of a multimedia project consists in the simplest (stationary) case of a column of the score, i.e. a single point in time of the movie. Where motion effects or video films are involved a "page" may also extend over a time window making use of several score columns.

Extensive multimedia projects involving intricately interlinked pages quickly become confusing. Since each page incorporates all contents and links, the copying of pages facilitates the job only to a limited degree when working with a standard multimedia authoring tool hitherto available.

One object of the invention is thus to provide a method by means of which the user is able to generate a multimedia project easier than with methods hitherto.

A further object of the invention is to provide an easy-to-use, user-friendly computer program for generating a multimedia project.

SUMMARY OF THE INVENTION

The object of the invention is achieved by a method for generating a multimedia project comprising at least one page with the aid of a computer, a storage medium which the computer can access, an input device, a display and a standard multimedia authoring tool comprising the following steps:

providing the multimedia elements desired for the multimedia project on the storage medium, providing one or more templates generated in the format of the standard multimedia authoring tool with predefined dummies on the storage medium, defining the structure of the multimedia project with the aid of the input device, the display and computer by defining the desired number of pages of the multimedia project and assigning the pages to desired templates, saving the structure on the storage medium, assigning to the dummies the desired multimedia elements and functions with the aid of the input device, the display and the computer and saving the assignments on the storage medium, communicating the data stored in the two preceding steps to the standard multimedia authoring tool, generating the multimedia project with the standard multimedia authoring tool using the data communicated in the previous step.

Since the structure and layout of the multimedia project can at first be developed independent of the standard multimedia authoring tool, and thus no knowledge of the standard multimedia authoring tool is required, the work process is simplified for the user. Making use of ready-made templates for generating the pages of the multimedia project is an additional simplification. Now, the user is able to generate a complicated multimedia project practically with no knowledge of the standard multimedia authoring tool since once the structure and layout have been generated subsequent translation of the information thus defined into a multimedia project occurs in an automated way by the standard multimedia authoring tool.

A user is thus able to simply generate a complicated multimedia project without having to familiarize himself with the wealth of details hitherto needed for him to generate a multimedia project with current standard multimedia authoring tools. Now, the user simply selects via a user interface in ready-made menus the desired structure of the project and the templates for the individual pages occurring in the structure of the project and assigns the desired multimedia elements to the dummies on the templates. The data thus defined is then communicated to a standard multimedia authoring tool comprising universal options. This permits simple and efficient generating of multimedia projects, especially of standardized multimedia projects the configuration of which is repeated in many projects making the generation of templates worthwhile without having to sacrifice the wealth of options provided by a standard multimedia authoring tool, since, where necessary, page layout can be done in the standard multimedia authoring tool when single pages require an individual layout and no suitable templates are available.

The method in accordance with the invention allows the generation of a multimedia project to be easily distributed among various users differingly qualified since editing of the templates, of the structure and of the content is tiered separately in processing. This enables e.g. users in different fields such as graphics specialists, managers and developers to work simultaneously on a multimedia project.

The method is implemented to advantage with the aid of a computer program (Multimedia Generation Program, MGP) permitting information as to the defined structure, the generated templates, the dummies used as well as their properties and functions to be communicated to the standard multimedia authoring tool. The conversion itself may be done by a MGP component running in this standard multimedia authoring tool.

In this context it is good practice when information as to dummy properties is available to various components of the program.

Making use of the method in accordance with the invention greatly simplifies the tasks, as compared to using the standard multimedia authoring tool alone, since layout and structure of the multimedia project are separated as well as due to the enhanced flexibility in editing a project already existing or currently being generated since the page content is not contained in the layout but merely references thereto saved in a data base.

Preferably, editing of the templates, defining the structure and assigning of the multimedia elements to the dummies is done via intercommunicating MGP components each differing from the other.

The method is expandable by writing the generated multimedia project on a CD.

The preferred standard multimedia authoring tool is Macromedia Director® in the version 7.02 or higher.

The method in accordance with the invention is preferably implemented via a user interface in a computer system for generating a multimedia project comprising at least one page, including an input device for converting information as to the structure of a multimedia project consisting of information as to the desired number of pages of the multimedia project and as to the assignment of the pages to templates containing desired predefined dummies and information as to the assignment of desired multimedia elements and functions to the dummies into a digital representation of the structure as well as of the assignment of desired multimedia elements and functions to the dummies, a processing device for communicating the digital representation to a standard multimedia authoring tool and generating a digital representation of the multimedia project with the aid of the communicated representation and the standard multimedia authoring tool and an output device including a display serving to convert the digital representation of the multimedia project into a multimedia project and to display the multimedia project to the user.

The invention relates furthermore to a computer program (multimedia generating program, MGP) for generating a multimedia project comprising at least one page comprising the following elements:

code for generating the templates including predefined dummies in the format of a standard multimedia authoring tool, code for defining the structure of the multimedia project by defining the desired number of pages of the multimedia project and by assigning the pages to the desired templates generated before, code for assigning the desired multimedia elements and functions to the dummies of the pages, code for communicating the data defining the structure and the assignment of the multimedia elements and functions to the dummies to a standard multimedia authoring tool, code for generating the multimedia project with the aid of the data communicated in the previous step and of the standard multimedia authoring tool.

Making use of such a computer program significantly facilitates the generation of a multimedia project as compared to the conventional practice with the standard multimedia authoring tool since all steps needed to generate the multimedia project run in MGP and the user does not come into contact with the standard multimedia authoring tool involving a complicated learning process.

A further aspect of the invention consists of a method for generating a multimedia project comprising at least one page wherein one or more templates generated in the format of a standard multimedia authoring tool with predefined dummies is/are made available on a server, signals output by the server and representing the templates available on the server are received by a computer connected to the server via a network, signals output by the computer connected to the server via a network and representing the structure of a multimedia project are received by the server, the structure comprising the number of pages of the multimedia project and the assignment of the pages to specific of the templates made available on the server;

the structure is saved on a storage medium connected to the server, signals output by the computer connected to the server via the network and representing the assignment of the multimedia elements and functions to the dummies are received by the server, the assignments are saved on the storage medium connected to the server, the data saved in the previous steps is communicated to a standard multimedia authoring tool saved on the storage medium, with the aid of the data communicated in the previous step the multimedia project is generated by the standard multimedia authoring tool on the server, and a signal representing the multimedia project is transmitted from the server to the computer.

In this method the user requires neither the standard multimedia authoring tool nor the MGP to be available on a computer at the user end. Both programs can be saved and run on a server end computer system. The user is required to transmit to the server only information as to the desired appearance of the templates, information as to the structure and assignment of multimedia elements to the dummies as well as the desired multimedia elements themselves.

The signal representing the multimedia project may be a file containing the completed multimedia project and transmitted from the server to the computer of the user. As an alternative the multimedia project generated on the server can be returned to the user e.g. on a CD by mailing.

BRIEF DESCRIPTION OF THE DRAWINGS

Further features and advantages of the method in accordance with the invention read from the following description of the preferred example embodiment and from the attached drawings in which.

DESCRIPTION OF THE PREFERRED EXAMPLE EMBODIMENT

Figure 1:
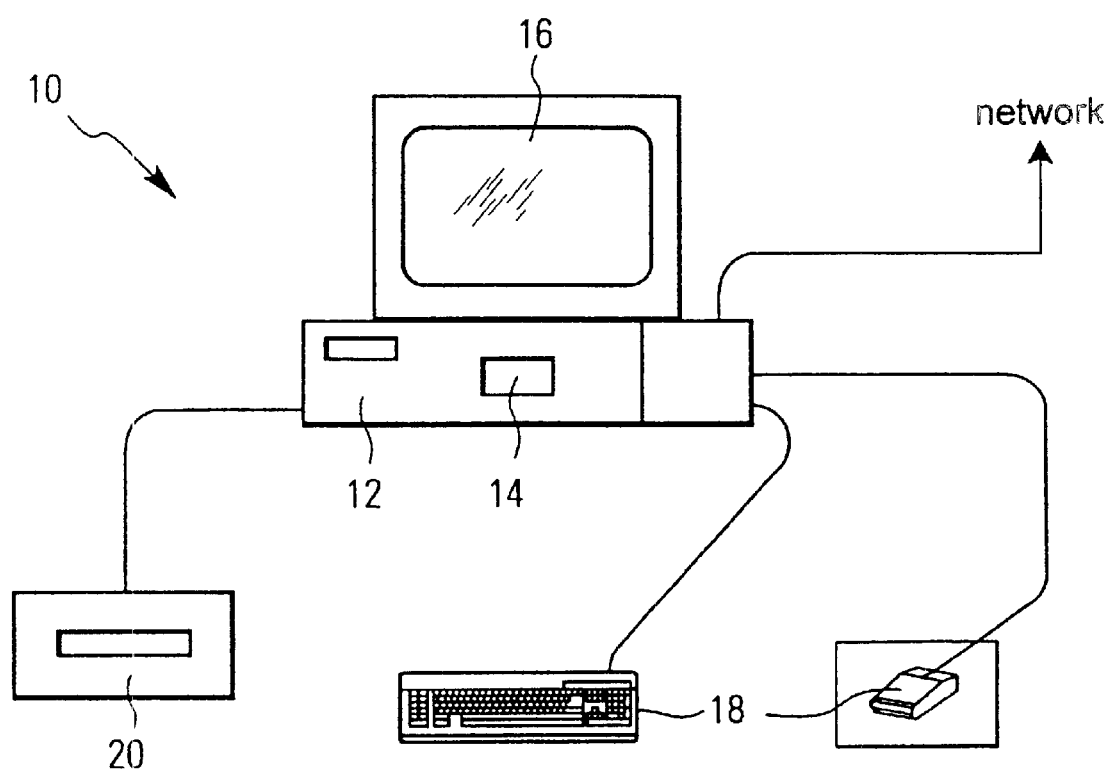
FIG. 1 is a schematic diagram of a computer system with the aid of which the method can be implemented.

The method in accordance with the invention for generating a multimedia project may be implemented e.g. with the aid of a computer program (MAP) on a computer system as illustrated in FIG. 1.

Before detaining FIG. 1 a few definitions are given to facilitate understanding the following description of the invention.

In this context a multimedia project is understood to be a set of interlinked pages on which specific multimedia elements are distributed in space and time.

A "page" of a multimedia project is understood to be that which appears in the viewer display at a point in time in the completed project. A page may contain as a component multimedia elements, e.g. videos or animations, variable in time.

Multimedia elements are files or data saved on a storage medium which form the components from which the pages of a multimedia project are composed, this involving e.g. images, texts, videos or sound files.

Furthermore in this description a standard multimedia authoring tool is understood to be a program generating a completed multimedia project from multimedia data externally input (i.e. from a user or other program) into the program. In such programs all multimedia elements intended for the pages of the multimedia project typically involve the trouble of having to be entered singly depending on the circumstances, e.g. by positioning a text window on a page with the computer mouse. The multimedia data comprises:

1. the set of the multimedia elements present in the multimedia project (in the Director® program these multimedia elements are defined by user input in the so-called "cast"),
2. the assignment of the multimedia elements to the individual pages of the multimedia project in space and time (in the Director® program these multimedia elements are defined by the user in space on the "stage" and in time in the "score" by the input of the user),
3. the assignment of properties and functions to the multimedia elements; and
4. the links between the individual pages of the multimedia.

Referring now to FIG. 1 there is illustrated a simple computer system 10 as may be used in implementing the method in accordance with the invention. The computer system 10 comprises a computer 12 including a memory 14 and a processor (not shown), a display 16 connected to the computer, input devices 18 (keyboard, mouse) connected to the computer and a CD ROM drive 20. The computer 12 is preferably connected to a network, e.g. the Internet. With the aid of the CD ROM drive 20 controlled by the computer CDs can be both read and written. Further storage media (diskette, DVD, hard disks) may be provided optionally.

The computer 12 may run e.g. a Microsoft Windows® based operating system or an Apple Macintosh® based operating system. The specific features of the method when run in a network will be explained later.

The method can be realized e.g. in a multimedia generation program, MGP for short, stored in the memory 14. User interaction with MGP is by known ways and means via the entry devices 18 and via the display 16 with the aid of the computer 12. The gist of the method in accordance with the invention (MGP) and subsequently how it works will now be detailed by way of an example embodiment.

MGP is a data base supported computer program on the basis of templates with which a user cooperates interactively. In cooperation with a standard multimedia authoring tool such as Macromedia Director®, MGP serves to generate multimedia projects.

A template in this context is understood to be a page of a multimedia project containing a number of dummies and which may be used as a model for generating pages of a multimedia project.

Depending on the multimedia project a dummy can be assigned desired multimedia elements (text, sound, image, video) as content having the desired properties (e.g. position on the page, size, volume . . . ) and functions (e.g. links, playing a video).

Defining the structure (number of pages, assignment of pages to templates) and the layout (configuration of the individual pages) of the multimedia project is undertaken in separate steps. The structure is imaged in a data base and the layout is generated on the basis of the templates generated beforehand. The contents of the dummies as desired for the concrete multimedia project is connected to the structure via the data base and thus to the project.

MGP supports the user in generating templates defining the layout of a single page of the multimedia project. For this purpose the user assigns dummies for multimedia elements to a page and defines their properties and functions.

In addition MGP supports the user in defining a structure of the project by the user defining on which templates the pages of the concrete multimedia project are to be based, how the pages of the project are to interrelate as a function of each other and how the pages are to be grouped.

Furthermore, MGP supports the user in assigning concrete multimedia elements to the dummies of the individual pages generated on the basis of the templates.

In conclusion, in making use of the templates of the pages forming the basis thereof and the assigned multimedia elements, MGP converts the structure into a multimedia project with the aid of the standard multimedia authoring tool (e.g. Macromedia Director®). This multimedia project can then be stored e.g. on a transportable data carrier (e.g. CD) and can also be edited, when required, with the standard multimedia authoring tool.

Stored in the memory of the computer system 10 are executable versions of a standard multimedia authoring tool program (e.g. Macromedia Director®, version 7.02), of a data base program (e.g. 4th Dimension Inc. 4D® program) as well as executable programs written in a standard programming language (e.g. C++).

Figure 2:
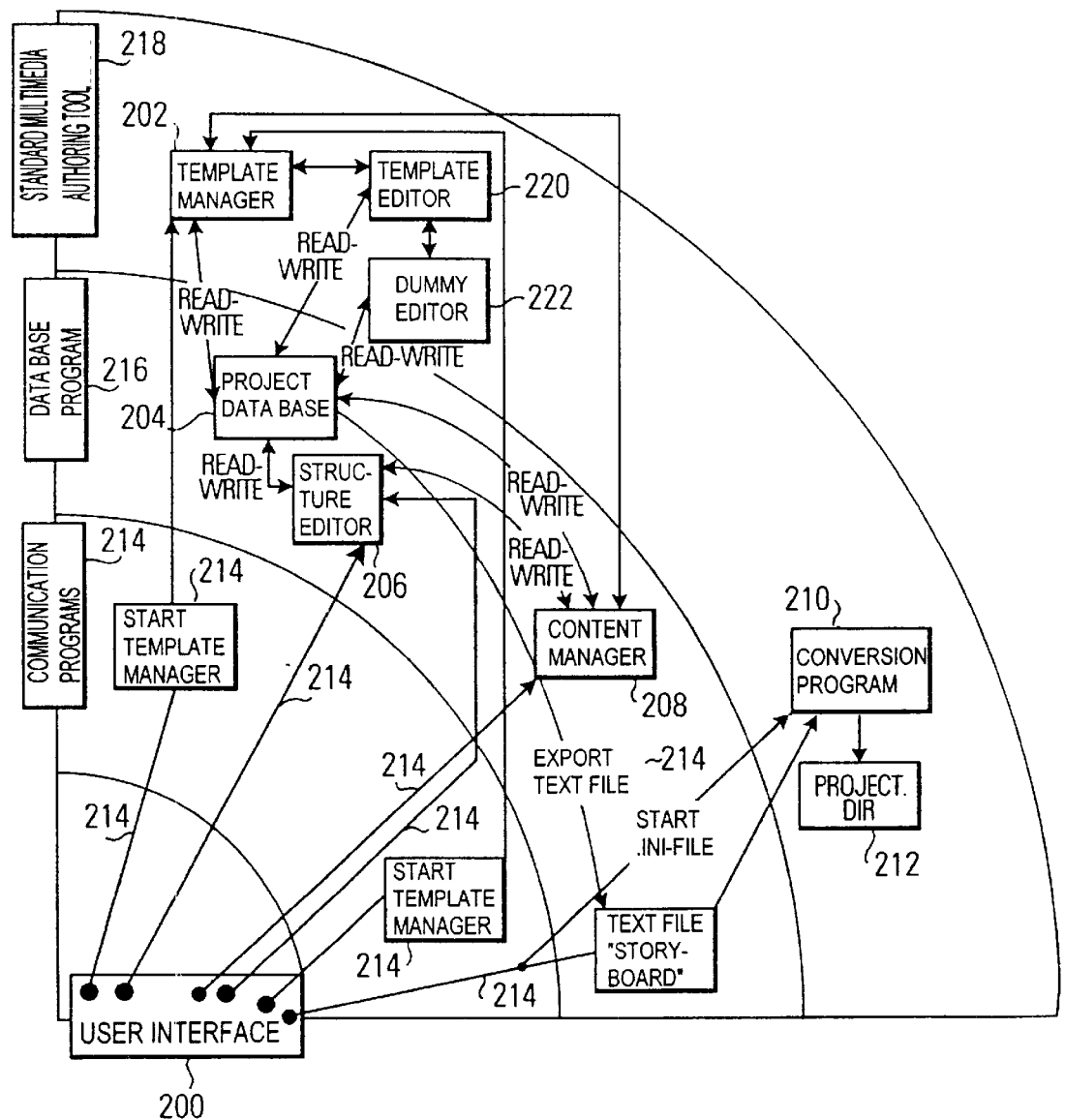
FIG. 2 is a schematic flow chart of a computer program for implementing the method in accordance with the invention.

Referring now to FIG. 2 there are illustrated the several components of MGP. A user interface 200 enables the user to communicate with the individual program components (e.g. via an input device and a display). In a template manager 202 templates can be generated and edited. In a project data base 204 the data relevant to the multimedia project (e.g. the assignment of the pages to templates, assignment of the multimedia elements to the dummies . . . ) is stored. This project data base 204 is accessed by a structure editor 206 enabling a user to input the structure of the multimedia project. A content manager 208 is responsible for assigning multimedia elements (contents) consisting of files, to the dummies. A conversion program 210 generates in conclusion from the information stored in the project data base 204 a multimedia project 212 (e.g. in the form of a Director® movie). In addition communicating programs (methods) 214 are provided for communication between the data base program 216 and the standard multimedia authoring tool 218 (e.g. Director®) which communicate the data or call program components or further programs.

The individual program components require differing software environments.

Thus, the user interface 200 is written as a data base application for a data base program 216 (in this context 4D®) likewise the project data base 204, the structure editor 206 and the content manager 208.

The template manager 202 comprises a template editor 220 in which the templates can be edited and a dummy editor 222 in which dummy properties can be defined, both of which are written in the format of the standard multimedia authoring tool and in this example embodiment are MIAWs ("movie in a window", i.e. autonomous Director® movies executed in a window).

The conversion program 210 is written in Lingo® and runs as a MIAW directly in Director®, it requiring a Director® version installed on the computer.

The communication between the data base program 216 and the program components generated for Director® is handled by (compiled) communication programs (methods) written in C++, a method in this sense being understood to be a string of instructions triggering an action.

It is via such communication programs that the template manager 202, template editor 220 and the dummy editor 222 can communicate with the project data base 204 for updating and saving in the project data base 204 changes relating to the templates and/or dummies.

The communicating programs 214 handle, more particularly, initiating the template editor from the user interface 200, communicating information about the dummies from the template editor 220 to the project data base 204 and communicating structure information to the conversion program 210. With the aid of the communication programs files can also be exported from program components or communicated to program components.

It will now be explained how with the aid of the method in accordance with the invention a multimedia project can be generated by simple and efficient means:

Via the user interface 200 displayed on the display 16 a user is able to select with the aid of the enter device in a first step whether a new multimedia project is to be commenced or an existing multimedia project is to be edited. If a new multimedia project is to be commenced the data base program (4D®) 216 creates the directories needed to save the project data base 204 and the information required by the standard multimedia authoring tool. If an existing multimedia project is to be edited the data base program 216 opens the corresponding, already existing directories of this multimedia project. After this selection the user gains access to a menu generated in the format of the data base program 216 from which the template manager 202 for generating or editing the templates, the structure editor 206 for generating or editing the structure of the multimedia project and the content manager 208 for assigning the multimedia elements to the dummies can be called.

Template processing will now be detailed.

For generating or editing a template the MGP opens with the aid of a communicating program 214 the template manager 202, which is preferably realized as Director® MIAW.

The template manager offers in usual selection menus the options of adding, generating, copying, deleting, previewing or importing from a library (see below) a template, and shows a list of the templates used in the project. The template manager 202 contains the template editor 220 and the dummy editor 222. For editing a new or existing template the template editor is opened.

In the template editor 220 the user is able to add dummies to a template or delete them therefrom. Dummies can also be copied from one template to another or duplicated within a template. In addition, dummies are be named.

In the preview function the user is able with the aid of the input device and the display to arrange the dummies on the template in the way they are to appear in the completed multimedia project. In this not only the position but also the size of the dummies as well as their transparency and foreground and background location are defined. These dummy properties are stored.

So that in the preview function the template can appear as in the completed multimedia project, the way in which the preferred standard multimedia authoring tool Director® works requires each dummy to first be assigned a default multimedia element as content which in the course of the method is replaced by a multimedia element as desired by the user for the multimedia project that is just been generated. Default multimedia elements may be provided e.g. for a text, an image, a video or a sound.

When a dummy is added the user is requested to state the kind of dummy (e.g. image, video film, text, sound etc). This information is stored together with the dummy and put to use in the consistency check as described below.

Depending on the kind of dummy involved it is preferably also assigned predefined functions, e.g. a back button a link to one of the previous pages, a start button the starting of a video film etc.

In selecting certain kinds of dummies further dummies can be automatically inserted into the template as are usually required in cooperation with the dummy in each case, e.g. for a video film the corresponding start and stop buttons.

All dummies used in the template are listed in a dummy list.

It is possible to already assign multimedia elements as content as desired to the dummies for the multimedia project in this menu. The content thus assigned to a dummy is displayed in the preview.

To edit the dummies the dummy editor 222 can be opened from the template editor 220 via selecting a specific dummy in the dummy list or in the preview. In the dummy editor the properties of a dummy such as size, position on the page, functions etc. can be edited. It is understood that the features as mentioned are merely by way of example, further possible features being:

"optional content": this feature informs the conversion program that the dummy is only to be inserted in the completed project when a concrete multimedia element has been assigned to it;

"global" dummy: this property is explained below;

"linguistic dependence": this properties enables the user to specify whether a dummy in a multilingual multimedia project (see below) is to be defined distinguished in various languages. If this property is activated a separate multimedia element must be assigned to the dummy in the project data base in each language of the project. If it is not activated it is sufficient to assign a multimedia element to the dummy once only. This multimedia element is then automatically assigned to the dummy in each language branch. This property is useful e.g. in generating multilingual homepages;

"multiple highlight": groups of dummies can be provided with this property in which one or more elements of the group are required to respond in a certain way when a corresponding element of the group in the completed multimedia project is selected by a user action; e.g. a group of dummies may change in color when the mouse pointer sweeps the corresponding dummy;

"searchable": this property renders a text accessible for any search engines contained in the multimedia project.

Depending on the kind of dummy involved the properties meaningful for this kind of dummy are made available. For example, a text field can be rendered "searchable" by search words whilst in a video film or an image this is not possible.

The special features of the aforementioned so-called "global" dummy will now be detailed. Unlike "normal" dummies appearing only in the template to which they are assigned and whose content appears only on the pages basing on this template a "global" dummy can appear in every template and accordingly with the same multimedia element in each case as content on all pages of the project. The multimedia element needs to be assigned to the global dummy once only. This property is useful for dummies required to appear at the same place on a plurality of pages e.g. a background image including a company logo required to appear on all pages and "underpages" of an Internet presentation of a company. The dummy does not automatically appear in each template, but instead can be taken over from a list of global dummies listing all global dummies into the corresponding template. This editing is done in the template editor in which also the list of global dummies is shown. A global dummy can be inserted at any point in time in managing the project in the template editor.

A global dummy can be assigned its content also from the template editor to permit e.g. directly checking the effect of a background image. However, all changes made to a global dummy, including changes to the functions and properties assigned thereto appear throughout the complete project. Therefore, the user is asked by the MGP whether the effect of an undertaken change really is intended.

Functions assignable to dummies include e.g. links (such as jumping to a specific page of the multimedia project), starting a piece of music, fast-forwarding a video film etc. Links connected to jump addresses relating to concrete multimedia elements or specific pages of the multimedia project (except easy-to-define start or end pages of each project) are better assigned to concrete multimedia elements in the content manager 208.

In addition to defining the possible appearance of the individual pages of the multimedia project, i.e. the possible layout of the project as done by configuring the templates as described above, the definition of the structure of the multimedia project is an important step in generating a multimedia project. It is to be noted that in these two steps the user does not come into contact with the standard multimedia authoring tool, he instead being completely guided by MAP with its easy-to-use selection menus.

The structure mainly comprises the number of pages of the multimedia project and the assignment of each page to specific templates serving as a model for each page as selected in the template manager 202. The structure of the multimedia project can be defined and edited with the structure editor 206 callable from the user interface 200.

The structure editor 206 can be used to edit the structure of the multimedia project. The user is able to generate new pages and to assign them a place in the cture. Pages can be grouped together to increase the clarity. This is e.g. useful when several pages depend on a host page or pages in various languages are linked to one and the same page. The arrangement of the pages is represented in a tree structure and is done e.g. by "drag and drop" with a computer mouse.

In the embodiment of the method in accordance with the invention as described each page needs to be based on one of the templates named in the template manager 202. In generating a new page the user is thus required by the structure editor 206 to assign this page a template whose layout is desired for this page. In addition a page name must, and a group name, may be allocated, it also being possible to enter a short description of the page to facilitate identifying a page searched for by the user and navigating in the project. Page properties are stored in the project data base 204.

In a further step the dummies on the pages can be "filled with contents" by assigning the dummies the multimedia elements desired by the user for the multimedia project. This assignment is handled by the content manager 208, a further MGP component. A list of all dummies represented on this page as well as the multimedia elements assigned thereto is displayed for each edited page of the multimedia project. Also displayed in the structure editor 206 is the information as to the properties and functions of the individual dummies assigned in the dummy editor 222 and in the template editor 220 to thus show e.g. whether the dummy concerned is a global dummy. A "status display" informs the user as to whether a content has already been assigned to all dummies on the page. Dummies having the "optional content" property as described above are not being taken into account in establishing the status.

In the content manager 208 there is also the possibility of entering a short text to be assigned to a dummy, useful for instance for titles and captions, this not first requiring a multimedia element to be generated therewith.

To avoid errors in assigning content the content manager 208 implements checking the format of the multimedia element assigned to the dummy as content so that a dummy can only be assigned multimedia elements whose format has previously being authorized for this dummy. Thus, e.g. an image dummy cannot be assigned a text or a text dummy cannot be assigned a video film. The content manager 208 alerts the user to a wrong assignment by an error message.

The content manager 208 also makes it possible to link the individual pages of the multimedia project, it being possible for this purpose to assign links to the multimedia objects assigned dummies. A link may point from a multimedia element to another page of the project, to another multimedia element contained in this project or to an (external) (Internet) address.

The next section details linguistic dependence as aforementioned. Multimedia projects are often required to be available in several languages, e.g. in the case of homepages to be made available to viewers with different native languages. A viewer is thus able to select a language on an entrance page of a completed multimedia project and to browse the remaining multimedia project in the selected language without having to make a repeat selection. It may also be provided for that a user can change from each page to a corresponding page in another language. Most of the pages of such a multilingual multimedia project need exist multiply, it being the texts and images with text elements that mainly differ.

MGP in accordance with the preferred embodiment of the invention permits selecting a multilingual capability for a multimedia project. The languages of the project are preferably selected on commencement of a new project but may be changed in the course of processing. In a multilingual project the user assigns a desired language to a page, MGP then automatically grouping the pages in a common language.

As commented above, many pages of the project exist in multilingual multimedia projects in several embodiments having in principle the same content in which, however, the text concerned differs depending on the language. A few dummies in the templates forming the basis of such pages thus need to differ depending on the language of the page concerned (particularly texts) whilst others (e.g. a background image) may be the same on each of these pages. Thus dummies too, may also be assigned the feature "linguistic dependence". The content manager 208 is designed so that not linguistic dependent dummies on linguistic dependent pages need to be filled once only with a multimedia element, whereas linguistic dependent dummies need to be assigned a separate multimedia element on every page. The information as to the linguistic dependence of a dummy also appears in the content manager 208 enabling the user to determine whether the dummy can be the same on every page or whether it needs to be assigned differing content in the various language branches.

In the structure editor 206 the viewing can be restricted to pages in one language to enhance the clarity when several editors are working on the various language branches of the project. Thus, for example, when the content in the English language branch is being edited, the German language branch can be hidden.

The information as to the structure is stored by MGP in the project data base.

Previous steps in the method involved, for one thing, creating and providing the templates necessary for the multimedia project and, for another, generating information as to the properties of the dummies, the structure, the assignment of multimedia elements to the dummies and functions to the multimedia elements and storing this information in the project data base, i.e. without requiring the standard multimedia authoring tool hitherto. In the next step the information stored in the data base is communicated to the standard multimedia authoring tool and conversed with the aid of the standard multimedia authoring tool into a completed multimedia project.

The translation program 210 for generating a completed multimedia project in the format of the standard multimedia authoring tool (preferably Director®) is called from the user interface 200. For this purpose a text file (called "storyboard" in this context) is first exported from the data base program 216 (e.g. 4D®) containing the information from the project data base 204 which is then written on the hard disk in the corresponding project directory. Then a special file for initiating the standard multimedia authoring tool (a so-called ".ini-file") is called by a method. This initialization file results in Director® being opened with a predefined movie (termed "default.dir") and a MIAW is started with the conversion program 210. The aforementioned text file "storyboard" is loaded by the standard multimedia authoring tool and the conversion program converts the information contained therein into modifications of the "default.dir" project so that the completed multimedia project (termed "project.dir") is generated. The storyboard file furnishes the conversion program 210 all information needed to generate the completed multimedia project. The multimedia project is generated in the format of the standard multimedia authoring tool and preferably in Director® language.

In the preferred embodiment of the method in accordance with the invention the conversion program 210 requires the standard multimedia authoring tool Director® and runs as a MIAW.

Dummies still to be assigned content automatically receive the corresponding default multimedia element in conversion.

When the user edits the project only the changes are communicated to Director® in a repeat execution of the conversion program 210 and the corresponding multimedia project is edited.

The completed project is 100% compatible with the standard multimedia authoring tool (in this context Director®) and can be further edited in the standard multimedia authoring tool.

Communicating the data to the standard multimedia authoring tool is possible by any means known to a person skilled in the art and is not restricted to the ways and means as depicted in the present.

Further advantageous MGP features by the method in accordance with the invention will now be described.

Revising a completed MGP generated multimedia project can be preferably done by simple ways and means in a short time by its project data base being loaded and the changes then made the same as in a normally edited multimedia project.

To revise an already existing completed project the project is opened in MGP permitting access for editing to all templates, all dummies and their content since all of these elements are still stored in a data base. The user can then, as described above, revise the templates, assign a page some other template and/or the dummies other content. In conclusion MGP converts with the conversion program the revised project into a new multimedia project in the format of the standard multimedia authoring tool, i.e. there is no need to individually edit the existing project, instead recourse can be made to the advantages of data base oriented processing afforded by MGP.

MGP can be put to use to particular advantage when an (external) library with ready-made structures, templates and dummies is made available. This may contain e.g. templates for frequently reoccurring situations such as entrance pages, pages including search engines, pages with video films etc, as well as frequently reoccurring dummies having predefined function blocks e.g. forward or back buttons already carrying a linking function and change presentation on a mouse click, toolbars etc. For these dummies content may also be made available to save the user having to devise his movement buttons himself. To facilitate processing, readymade structures may also be made available in the library in which a number of pages are already interlinked in specific arrangements (e.g. linear) and all necessary navigation elements have already been inserted and filled with content. These ready-made structures, templates and dummies can be inserted by the user in his project thus saving him an enormous amount of time in processing. As soon as one of these ready-made elements has been incorporated in a multimedia project the structure, templates and dummies can all be simply edited by the user by ways and means as described above.

Enabling the user to add templates and/or dummies (including content, where necessary) he himself has created to such a library or to export templates and/or dummies into the library from already existing projects may also be provided for. A library may also be made available externally on a storage medium or via the Internet.

The libraries are preferably formatted the same as the data base program (e.g. 4D®) and saved as data base applications.

When using the preferred standard multimedia authoring tool Director® as well as the preferred data base program 4D® the method can be platformed for Windows as well as for Apple Macintosh since both Director® and 4D® offer versions for both platforms, i.e. merely the C++ communication programs need to be correspondingly compiled which is possible e.g. with CodeWarrior® software.

Networking with MGP permits simultaneous working by several users on various parts of the project to thus save time. Access conflicts etc. can be avoided by conventional techniques.

Where one or more pages of a desired multimedia project authored with the aid of MGP require individualization to such a extent that this is a nuisance or not possible at all via predefined templates, the user is able to design the pages either fully or in part with the versatile design options of the standard multimedia authoring tool. Since problems may be later encountered in making this change to the standard multimedia authoring tool, due to such changes not being entered into the project data base of MGP, these problems can be overcome by slaving a watchdog program to the standard multimedia authoring tool which records the changes made in the standard multimedia authoring tool to a multimedia project and passes them on to the project data base. Thus, changes made to a completed multimedia project which are not undertaken in MGP can also be mapped.

Another advantageous further development of MGP in accordance with the invention involves providing the user with Internet access to MGP for generating a multimedia project with templates and with a structure and converting it into a completed project, MGP then running completely on the selected Internet page, i.e. the user requiring no MGP program parts on his own computer. The completed project can then be sent to the user either as a burned CD or the user may receive a download authorization for transferring the completed multimedia project to his computer.

To make it simple for the user to process a multimedia project MGP is preferably designed so that the user has access from each user-accessible program component to all other user-accessible components, the conversion program understandably making an exception for this (although a test function may be provided which can be called e.g. from the template editor).

In conclusion the course of action by the method in accordance with the invention as well as the advantages in making use of a multimedia generating program (MGP) will now be summarized. One salient difference to the course of action required hitherto in generating a multimedia project with a standard multimedia authoring tool is that in the method in accordance with the invention editing the layout of the individual pages and the structure of the project can now be done in a data base supported MGP independent of the standard multimedia authoring tool. In accordance with the invention MGP first provides templates for the individual pages of the multimedia project by these being designed by the user or e.g. selected from a library. These templates contain dummies for the actual multimedia elements to be displayed on the pages of the multimedia project. In addition the structure of the project is defined by the individual pages of the project being assigned templates forming the basis for these pages. In the next step in MGP the dummies are assigned the desired multimedia elements. In all of the steps hitherto no use of the standard multimedia authoring tool itself is needed. Once all assignments have been concluded only the information as to the structure, the templates used and the assignment of the multimedia elements to the dummies is communicated to the standard multimedia authoring tool where a further component of MGP handles converting this information into a completed multimedia project. The user is thus able to implement the method without any knowledge of the standard multimedia authoring tool whatsoever thus greatly simplifying and facilitating his job and sparing him tedious familiarization with the thousands of design options afforded by the software of a standard multimedia authoring tool.

What is claimed is:

1. A method for generating a multimedia project comprising at least one page with the aid of a computer, a storage medium which the computer can access, an input device, a display and a standard multimedia authoring tool comprising the following steps:

providing the multimedia elements desired for the multimedia project on the storage medium, providing one or more templates generated in the format of the standard multimedia authoring tool with predefined dummies on the storage medium, defining the structure of the multimedia project with the aid of the input device, the display and computer by defining the desired number of pages of the multimedia project and assigning desired templates to the pages, saving the structure on the storage medium, assigning to the dummies the desired multimedia elements and functions with the aid of the input device, the display and the computer and saving the assignments on the storage medium, communicating the data saved in the two preceding steps to the standard multimedia authoring tool, generating the multimedia project with the standard multimedia authoring tool using the data communicated in the previous step.

2. A computer-readable storage medium, on which instructions are saved, prompting a computer processor to implement the method as set forth in claim 1.

3. The method as set forth in claim 1 wherein said dummies comprise properties.

4. The method as set forth in claim 3 wherein said properties comprise the position and size of said dummy.

5. The method as set forth in claim 1 wherein said functions comprise links.

6. The method as set forth in claim 1 wherein the structure of said multimedia project and the assignments of said dummies are stored in a data base.

7. The method as set forth in claim 1 wherein on said storage medium at least one library is provided from which previously generated templates, structures, contents or dummies can be imported into said multimedia project.

8. The method as set forth in claim 1 wherein said multimedia elements assigned to said dummies are selected from the group of image, sound, text and video files.

9. The method as set forth in claim 1 wherein said multimedia project is written on a CD.

10. The method as set forth in claim 1 wherein said templates can be edited.

11. The method as set forth in claim 10 wherein the template layout and the number and features of said dummies on said template can be defined.

12. The method as set forth in claim 1 wherein the generation of said multimedia project with said standard multimedia authoring tool is done with the aid of an additional program running in said standard multimedia authoring tool.

13. A computer program for generating a multimedia project comprising at least one page comprising:

code for generating templates in the format of a standard multimedia authoring tool, the templates including predefined dummies, code for defining the structure of the multimedia project by defining the desired number of pages of said multimedia project and by assigning said pages to desired templates generated before, code for assigning said desired multimedia elements and functions to said dummies of said pages, code for communicating data defining the structure and the assignment of said multimedia elements and functions to said dummies to a standard multimedia authoring tool, code for generating said multimedia project with the aid of the data communicated in the previous step and of said standard multimedia authoring tool.

14. A method for generating a multimedia project comprising at least one page wherein one or more templates generated in the format of a standard multimedia authoring tool and containing predefined dummies is/are made available on a server, signals output by said server and representing said templates available on said server are received by a computer connected to said server via a network, signals output by said computer connected to said server via a network and representing the structure of a multimedia project are received from said server, said structure comprising the number of pages of said multimedia project and the assignment of said pages to specific of said templates made available on said server;

said structure is saved on a storage medium connected to said server, signals output by said computer connected to said server via said network and representing the assignment of multimedia elements and functions to said dummies are received from said server, said assignments are saved on said storage medium connected to said server, data memorized in the previous steps is communicated to a standard multimedia authoring tool saved on said storage medium, with the aid of said data communicated in the previous step said multimedia project is generated on said server by said standard multimedia authoring tool, and a signal representing said multimedia project is transmitted from said server to said computer.

15. A method for generating a multimedia project comprising at least one page wherein one or more templates generated in the format of a standard multimedia authoring tool and containing predefined dummies is/are made available on a server, signals output by said server and representing said templates available on said server are received from a computer connected to said server via a network, signals output by said computer connected to said server via a network and representing the structure of a multimedia project are received from said server, said structure comprising the number of pages of said multimedia project and the assignment of said pages to specific of said templates made available on said server;

said structure is saved in a storage medium connected to said server, signals output by said computer connected to said server via said network and representing the assignment of multimedia elements and functions to said dummies are received from said server, said assignments are saved on said storage medium connected to said server, a signal output from said server via said network representing the data saved in the previous steps is received from said computer, said data is communicated to a standard multimedia authoring tool stored on a storage medium connected to said computer, with the aid of said data said multimedia project is generated by said standard multimedia authoring tool.

16. A user interface in a computer system for generating a multimedia project comprising at least one page, including an input device for translating information input by a user as to the structure of a multimedia project consisting of information as to the desired number of pages of said multimedia project and as to the assignment of said pages to desired templates, said templates containing predefined dummies and being generated in the format of a standard multimedia authoring tool, and information as to the assignment of desired multimedia elements and functions to said dummies into a digital representation of said structure as well as of said assignment of desired multimedia elements and functions to said dummies, a processing mechanism for communicating said digital representation to a standard multimedia authoring tool and for generating a digital representation of said multimedia project with the aid of said communicated representation and said standard multimedia authoring tool and an output device including a display serving to translate said digital representation of said multimedia project into a multimedia project and to display said multimedia project to the user.

* * * * *